(12) United States Patent
Ding

(10) Patent No.: US 10,557,930 B2
(45) Date of Patent: Feb. 11, 2020

(54) TIME MEASUREMENT-BASED POSITIONING METHOD, RELATED DEVICE, AND SYSTEM

(71) Applicant: Huawei Technologies Co., Ltd., Shenzhen (CN)

(72) Inventor: Zhiming Ding, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/327,593

(22) PCT Filed: Aug. 24, 2016

(86) PCT No.: PCT/CN2016/096510
§ 371 (c)(1),
(2) Date: Feb. 22, 2019

(87) PCT Pub. No.: WO2018/035740
PCT Pub. Date: Mar. 1, 2018

(65) Prior Publication Data
US 2019/0195996 A1   Jun. 27, 2019

(51) Int. Cl.
*H04W 24/00* (2009.01)
*G01S 11/02* (2010.01)
(Continued)

(52) U.S. Cl.
CPC ............ *G01S 11/02* (2013.01); *G01S 5/0247* (2013.01); *G06F 17/12* (2013.01); *H04W 24/10* (2013.01); *H04W 64/006* (2013.01)

(58) Field of Classification Search
CPC .......... G01S 11/02; G01S 5/0247; G01S 5/06; G06F 17/12; H04W 24/10; H04W 64/006;
(Continued)

(56) References Cited

U.S. PATENT DOCUMENTS

| 8,432,888 B2* | 4/2013 | Sakoda | ................. H04L 1/0002 |
| | | | 370/349 |
| 2006/0072694 A1* | 4/2006 | Dai | ....................... H04J 3/0667 |
| | | | 375/354 |

(Continued)

FOREIGN PATENT DOCUMENTS

| CN | 101990248 A | 3/2011 |
| CN | 105027643 A | 11/2015 |
| CN | 105230089 A | 1/2016 |

OTHER PUBLICATIONS

IEEE Std 802.11v™-2011 "Part 11: Wireless LAN Medium Access Control (MAC) and Physical Layer (PHY) specifications-Amendment 8: IEEE 802.11 Wireless Network Management," IEEE Computer Society, Feb. 9, 2011, 433 pages.

*Primary Examiner* — Mahendra R Patel
(74) *Attorney, Agent, or Firm* — Slater Matsil, LLP

(57) ABSTRACT

A method includes: separately performing, by a requester, time measurement with a plurality of responders, and calculating a location of the requester based on a measurement result. A measurement result obtained by the requester by performing time measurement with each responder includes time stamps t1, t2, t3, and t4, where t1 is a time when the responder sends a measurement frame, t2 is a time at which the requester receives the measurement frame, t3 is a time when the requester sends an acknowledgement frame in response to the measurement frame, and t4 is a time when the responder receives the acknowledgement frame. The acknowledgement frame is sent by the requester after waiting for a randomly generated short interframe spacing after receiving a last symbol of the measurement frame. The randomly generated short interframe spacing is randomly generated within a specified fluctuation range of a nominal short interframe spacing.

20 Claims, 9 Drawing Sheets

(51) Int. Cl.
  *G01S 5/02* (2010.01)
  *G06F 17/12* (2006.01)
  *H04W 24/10* (2009.01)
  *H04W 64/00* (2009.01)
(58) Field of Classification Search
  CPC ............. H04W 56/003; H04W 40/244; H04W 56/0035; H04W 4/00; H04L 9/00; H04L 7/00; H04J 3/0673
  USPC ............... 455/456.1, 450, 509; 370/329, 328
  See application file for complete search history.

(56) References Cited

U.S. PATENT DOCUMENTS

| | | | |
|---|---|---|---|
| 2009/0103501 A1* | 4/2009 | Farrag | H04W 74/02 370/337 |
| 2011/0026446 A1 | 2/2011 | Stacey | |
| 2012/0001793 A1* | 1/2012 | Jacobs | G01S 7/4004 342/146 |
| 2013/0091528 A1* | 4/2013 | Honda | H04N 21/436 725/85 |
| 2013/0100850 A1* | 4/2013 | Zhang | G01S 5/0205 370/254 |
| 2014/0105395 A1* | 4/2014 | Hart | H04W 12/02 380/259 |
| 2014/0213193 A1* | 7/2014 | Zhang | G01S 11/02 455/67.11 |
| 2014/0254511 A1* | 9/2014 | Aldana | H04W 56/003 370/329 |
| 2016/0029336 A1* | 1/2016 | Aldana | H04W 56/003 370/350 |
| 2016/0119889 A1* | 4/2016 | Zhang | G01S 11/02 370/350 |
| 2016/0198429 A1 | 7/2016 | Prechner et al. | |

* cited by examiner

TIME MEASUREMENT-BASED POSITIONING METHOD, RELATED DEVICE, AND SYSTEM

CROSS-REFERENCE TO RELATED APPLICATIONS

This application is a national stage of International Application No. PCT/CN2016/096510, filed on Aug. 24, 2016, which is hereby incorporated by reference in its entirety.

TECHNICAL FIELD

The present invention relates to the field of positioning technologies, and in particular, to a time measurement—based positioning method, a related device, and a system.

BACKGROUND

A WiFi (Wireless Fidelity) standard IEEE 802.11 defines a fine time measurement (FTM) process between two wireless communication nodes, as shown in FIG. 1A. A first FTM measurement process in a burst period is used as an example. The FTM process is specifically as follows: After a requester, for example, a station (STA) (which is usually a terminal device such as a mobile phone), sends an FTM measurement request to a responder, for example, an access point (AP), the responder responds to the requester, sends a measurement frame FTM_1 to the responder, and records a sending time t1_1 of the measurement frame FTM_1. Correspondingly, the requester receives the measurement frame FTM_1 and records a receiving time t2_1 of the measurement frame FTM_1. After receiving the measurement frame FTM_1, the requester waits for a fixed time, a short inter-frame spacing (SIFS), according to IEEE 802.11; then sends an acknowledgement (ACK) frame to the responder; and records a sending time t3_1 of the acknowledgement frame. Correspondingly, the responder receives the acknowledgement frame and records a receiving time t4_1. As shown in FIG. 1A, the responder sends a captured time stamp (t1_1, t4_1) to the requester in a next FTM measurement frame FTM_2, so that the requester may calculate a distance between the requester and the responder based on the times t1_1, t2_1, t3_1, and t4_1.

It can be learned by referring to IEEE 802.11 that a time of a one-way flight (ToF) of a message (the measurement frame or the acknowledgement frame) between the access point and the station is equal to [(t4−t1)−(t3−t2)]/2. In this case, the station may calculate the distance r between the access point and the station based on the following formula: r=C×[t4−t1)−(t3−t2)]÷2, where C is a speed of light.

A relatively typical positioning method used in the prior art is trilateration. As shown in FIG. 2, on one plane, locations of three APs (an AP1, an AP2, and an AP3 that are not in a straight line) are known to a STA. The STA is located on a circumference of a circle that is centered at the location of each AP and whose radius is a distance from the STA to the AP. A point of intersection of three circles is a location of the STA.

Mathematical formulas of trilateration are as follows:

$$\begin{cases} \sqrt{(x_{AP1} - x)^2 + (y_{AP1} - y)^2} = r_1 \\ \sqrt{(x_{AP2} - x)^2 + (y_{AP2} - y)^2} = r_2 \\ \sqrt{(x_{AP3} - x)^2 + (y_{AP3} - y)^2} = r_3 \end{cases}$$

where $r_1$, $r_2$, and $r_3$ each may be obtained by multiplying a ToF between each AP and the STA by the speed of light. It can be seen from the foregoing formulas that the STA may calculate the location of the STA based on the three APPs whose locations are known and a time of flight of a message from the STA to each of the three APs. The foregoing positioning method may also be extended to three-dimensional (3D) space. During positioning in the three-dimensional space, a formula for calculating a distance between the STA and an additional AP further needs to be obtained. To be specific, the STA requires at least four APs (which are not located on one plane) for positioning the location of the STA.

For APs in FIG. 1B, using an AP1 as an example, the AP1 already knows a location ($x_{AP1}$, $y_{AP1}$) of the AP1, t1, and t4. Although a STA does not notify t2 and t3 to the AP1, it can be seen from the foregoing calculation process that the AP1 can calculate a distance from the STA to the AP1 provided that the AP1 knows (t3−t2).

It can be learned by referring to FIG. 1C that a SIFS is a time from an end of a last symbol in a current frame (for example, a measurement frame) to a start of a first symbol in a preamble sequence of a next frame (for example, an ACK frame). For a STA, an end moment of a last symbol of the measurement frame is a moment at which the STA finishes receiving the measurement frame. It can be seen from FIG. 1C that t2 is a time at which the STA receives a first symbol of the measurement frame, t3 is a time at which the SA sends the first symbol of the measurement frame, and (t3−t2) is actually equal to a length of a SIFS+a frame length Length of the measurement frame. The AP already knows the frame length Length of the measurement frame and the SIFS stipulated in the IEEE 802.11 standard. Therefore, for the AP, (t3−t2) is also a known value actually. There is a specific deviation between a SIFS value actually used by the STA and a SIFS value stipulated in the standard (a deviation within a specific range is allowed for the SIFS value stipulated in the standard). However, the SIFS value actually used by the STA is also a fixed value. Therefore, (t3−t2) is also a constant value.

In this way, an AP1 can calculate a location of the STA according to the trilateration by further obtaining only respective locations of an AP2 and an AP3, frame lengths of measurement frames respectively sent by the AP2 and the AP3, and time stamps t1 and t4; and the AP1 may further calculate the SIFS value actually used by the STA. This is also applicable to the AP2 and the AP3. The location of the STA can be calculated by obtaining only locations of the other two APs, frame lengths of measurement frames sent by the other two APs, and time stamps t1 and t4. As a result, the location of the STA is transparent to an AP or a positioning system in which an AP is located. This is disadvantageous to protection of location privacy of the STA.

SUMMARY

Embodiments of the present invention provide a time measurement—based positioning method, a related device, and a system. A requester (for example, a STA) in time measurement randomly generates an actual SIFS within a specified fluctuation range of a nominal SIFS. This can prevent a location of the requester from being learned by a responder (for example, an AP or a system in which an AP is located) that sends the measurement frame, thereby improving privacy of positioning of the requester.

According to a first aspect, a time measurement—based positioning method is provided, including: separately performing, by a requester, time measurement with a plurality of responders, and calculating a location of the requester based on a measurement result, where a measurement result obtained by the requester by performing time measurement with each responder includes time stamps t1, t2, t3, and t4, t1 is a time at which the responder sends a measurement frame, t2 is a time at which the requester receives the measurement frame, t3 is a time at which the requester sends an acknowledgement frame in response to the measurement frame, t4 is a time at which the responder receives the acknowledgement frame, the acknowledgement frame is sent by the requester after waiting for a randomly generated short interframe spacing after receiving a last symbol of the measurement frame, the randomly generated short interframe spacing is a short interframe spacing that is actually used by the requester and that is randomly generated by the requester within a specified fluctuation range of a nominal short interframe spacing, and the nominal short interframe spacing is a short interframe spacing agreed upon between the plurality of responders and the requester (where the nominal short interframe spacing may be, for example, a SIFS stipulated in an IEEE 802.11 standard).

In this embodiment of the present invention, an algorithm for calculating a planimetric location (x, y) of the requester (for example, a STA) may be as follows:

$$\begin{cases} \sqrt{(x_{AP1}-x)^2+(y_{AP1}-y)^2} = C*[(t4_{AP1}-t1_{AP1})-(t3_{AP1}-t2_{AP1})]/2 \\ \sqrt{(x_{AP2}-x)^2+(y_{AP2}-y)^2} = C*[(t4_{AP2}-t1_{AP2})-(t3_{AP2}-t2_{AP2})]/2 \\ \sqrt{(x_{AP3}-x)^2+(y_{AP3}-y)^2} = C*[(t4_{AP3}-t1_{AP3})-(t3_{AP3}-t2_{AP3})]/2 \end{cases},$$

where $t1_{AP1}$, $t2_{AP1}$, $t3_{AP1}$, and $t4_{AP1}$ are measurement results obtained by the requester (for example, the STA) by performing time measurement with a responder AP1, and $(x_{AP1}, y_{AP1})$ is a location of the responder AP1; $t1_{AP2}$, $t2_{AP2}$, $t3_{AP2}$, and $t4_{AP2}$ are measurement results obtained by the requester (for example, the STA) by performing time measurement with a responder AP2, and $(x_{AP2}, y_{AP2})$ is a location of the responder AP2; and $t1_{AP3}$, $t2_{AP3}$, $t3_{AP3}$, and $t4_{AP3}$ are measurement results obtained by the requester (for example, the STA) by performing time measurement with a responder AP3, and $(x_{AP3}, y_{AP2})$ is a location of the responder AP3. It should be noted that the AP1 to the AP3 in the algorithm expression may be any three of the plurality of responders.

The foregoing algorithm expression may be extended to calculating a location of the requester in three-dimensional space. During positioning in the three-dimensional space, a formula for calculating a distance between the requester (for example, the STA) and another responder (for example, an AP) further needs to be obtained. To be specific, results of time measurement separately performed by the requester (for example, the STA) with at least four responders (for example, APs) are needed to calculate the location of the requester (for example, the STA). An algorithm for calculating the location (x, y, z) of the requester (for example, the STA) in the three-dimensional space may be as follows:

$$\begin{cases} \sqrt{(x_{AP1}-x)^2+(y_{AP1}-y)^2+(z_{AP1}-z)^2} = C*\frac{[(t4_{AP1}-t1_{AP1})-(t3_{AP1}-t2_{AP1})]}{2} \\ \sqrt{(x_{AP2}-x)^2+(y_{AP2}-y)^2+(z_{AP2}-z)^2} = C*\frac{[(t4_{AP2}-t1_{AP2})-(t3_{AP2}-t2_{AP2})]}{2} \\ \sqrt{(x_{AP3}-x)^2+(y_{AP3}-y)^2+(z_{AP3}-z)^2} = C*\frac{[(t4_{AP3}-t1_{AP3})-(t3_{AP3}-t2_{AP3})]}{2} \\ \sqrt{(x_{AP4}-x)^2+(y_{AP4}-y)^2+(z_{AP4}-z)^2} = C*\frac{[(t4_{AP4}-t1_{AP4})-(t3_{AP4}-t2_{AP4})]}{2} \end{cases},$$

where $(x_{APj}, y_{APj}, z_{APj})$ is a location of a responder APj (j=1, 2, 3, 4) in the three-dimensional space; and $t1_{APj}$, $t2_{APj}$, $t3_{APj}$, and $t4_{APj}$ are measurement results obtained by the requester (for example, the STA) by performing time measurement with the responder APj.

When the method described in the first aspect is implemented, a spacing time that is between the measurement frame and the ACK frame in response to the measurement frame and that is used by the requester (for example, the station) is not the nominal short interframe spacing stipulated in the protocol, but is randomly generated within the specified fluctuation range of the nominal short interframe spacing. Therefore, the responder (for example, the AP) cannot accurately calculate a value of a time stamp (t3−t2) based on the nominal short interframe spacing, and consequently, cannot accurately estimate the location of the requester (for example, the station). This improves privacy of positioning of the station.

With reference to the first aspect, in some embodiments, the measurement result may be a measurement result of $i^{th}$ time measurement, t1 and t4 are recorded by the responder in a process of the $i^{th}$ time measurement, t2 and t3 are recorded by the requester in the process of the $i^{th}$ time measurement, and t1 and t4 are carried in a measurement frame sent by the responder to the requester in a process of $(i+1)^{th}$ time measurement. Herein, i is a positive integer.

With reference to the first aspect, in some embodiments, under a condition that IEEE 802.11 is complied with (a fluctuation magnitude of a SIFS actually measured in a propagation medium relative to the nominal SIFS cannot exceed ±10%×Delay), the specified fluctuation range of the nominal short interframe spacing in this embodiment of the present invention may include a first interface [aSIFSTime−A1, aSIFSTime] and/or a second interval [aSIFSTime, aSIFSTime+A2].

A1 is a maximum magnitude by which the randomly generated short interframe spacing can be shortened relative to the nominal short interframe spacing aSIFSTime, and A2 is a maximum magnitude by which the randomly generated short interframe spacing can be prolonged relative to the nominal short interframe spacing. In actual application, the specified fluctuation range may be alternatively a subset of the first interval, a subset of the second interval, or a union set of these subsets.

Specifically, A1 and A2 are positive numbers, and the delay is a fixed sum of delays that is defined at a physical layer.

Delay=aCCATime+aRxTxTurnaroundTime+MACProcessingDelay, where aCCATime is a clear channel assessment delay, aRxTxTurnaroundTime is a receive/transmit turnaround delay, and MACProcessingDelay is a MAC-layer processing delay.

With reference to the first aspect, in some embodiments, in order to comply with IEEE 802.11, selection of A1 in this embodiment of the present invention needs to further meet the following condition: $A1 \leq 10\%*Delay$.

With reference to the first aspect, in some embodiments, in order to comply with IEEE 802.11, selection of A2 in this embodiment of the present invention needs to further meet the following condition: $2*ToF+A2 \leq 10\%*Delay$, where ToF=Distance/C, the distance represents a distance between the requester and the responder, and C represents a speed of light. In other words, $A2 \leq 10\%*Delay-2*Distance/C$.

With reference to the first aspect, in some embodiments, if the distance is less than a preset distance threshold, it indicates that the location of the requester coincides with a location of the responder, and $A2 \leq 10\%*Delay$. Specifically, the distance may be obtained through analysis by the requester based on signal strength of the measurement frame sent by the responder.

With reference to the first aspect, in some embodiments, in order to reserve a sufficient delay time for signal receiving, sending, and processing, for example, a transmit/receive turnaround delay and a MAC processing delay, the SIFS randomly generated by the requester (for example, the STA) cannot be advanced by too much time relative to the nominal SIFS. Optionally, $A1 \leq w*10\% \times Delay$, and $0<w<1$, where w may be an experience weight. In actual application, a value of w may be determined based on a specific delay status of a communications system. For example, when aSIFSTime=16 μs, Delay=9 μs, and an actually measured total delay of the communications system is 15.55 μs, a value of w may be 0.5. In this case, $A1 \leq 5\% \times Delay$. To be specific, the SIFS randomly generated by the requester can be advanced by a maximum of $5\% \times Delay=0.45$ μs relative to the nominal SIFS.

According to a second aspect, a communications apparatus is provided, configured to implement the method described in the first aspect. The communications apparatus may include a processor, a memory, a transmitter, a receiver, a random number generator, and a clock module, where the receiver is configured to receive a measurement frame sent by a responder; the random number generator is configured to randomly generate a short interframe spacing within a specified fluctuation range of a nominal short interframe spacing, where the nominal short interframe spacing is a short interframe spacing agreed upon between the responder and the requester; the clock module is configured to wait for the short interframe spacing randomly generated by the random number generator, after the receiver finishes receiving a last symbol of the measurement frame; the transmitter is configured to: when the wait of the clock module ends, send, to the responder, an acknowledgement frame in response to the measurement frame; the memory is configured to store a measurement result generated through time measurement performed by the communications apparatus with the responder, where the measurement result includes time stamps t1, t2, t3, and t4, t1 is a time at which the responder sends the measurement frame, t2 is a time at which the requester receives the measurement frame, t3 is a time at which the requester sends the acknowledgement frame in response to the measurement frame, and t4 is a time at which the responder receives the acknowledgement frame; and the processor is configured to calculate a location of the communications apparatus based on measurement results that are obtained by the communications apparatus by separately performing time measurement with a plurality of responders and that are stored in the memory.

With reference to the second aspect, in some embodiments, the measurement result may be a measurement result of $i^{th}$ time measurement, t1 and t4 are recorded by the responder in a process of the $i^{th}$ time measurement, t2 and t3 are recorded by the requester in the process of the $i^{th}$ time measurement, and t1 and t4 are carried in a measurement frame sent by the responder to the requester in a process of $(i+1)^{th}$ time measurement. Herein, i is a positive integer.

With reference to the second aspect, in some embodiments, under a condition that IEEE 802.11 is complied with (a fluctuation magnitude of a SIFS actually measured in a propagation medium relative to the nominal SIFS cannot exceed $\pm 10\% \times Delay$), the specified fluctuation range of the nominal short interframe spacing in this embodiment of the present invention may include a first interface [aSIFSTime−A1, aSIFSTime] and/or a second interval [aSIFSTime, aSIFSTime+A2].

A1 is a maximum magnitude by which the randomly generated short interframe spacing can be shortened relative to the nominal short interframe spacing aSIFSTime, and A2 is a maximum magnitude by which the randomly generated short interframe spacing can be prolonged relative to the nominal short interframe spacing. In actual application, the specified fluctuation range may be alternatively a subset of the first interval, a subset of the second interval, or a union set of these subsets.

Specifically, A1 and A2 are positive numbers, and the delay is a fixed sum of delays that is defined at a physical layer.

Delay=aCCATime+aRxTxTurnaroundTime+MACProcessingDelay, where aCCATime is a clear channel assessment delay, aRxTxTurnaroundTime is a receive/transmit turnaround delay, and MACProcessingDelay is a MAC-layer processing delay.

With reference to the second aspect, in some embodiments, in order to comply with IEEE 802.11, selection of A1 in this embodiment of the present invention needs to further meet the following condition: $A1 \leq 10\%*Delay$.

With reference to the second aspect, in some embodiments, in order to comply with IEEE 802.11, selection of A2 in this embodiment of the present invention needs to further meet the following condition: $2*ToF+A2 \leq 10\%*Delay$, where ToF=Distance/C, the distance represents a distance between the requester and the responder, and C represents a speed of light. In other words, $A2 \leq 10\%*Delay-2*Distance/C$.

According to a third aspect, a communications apparatus is provided, including a functional unit for executing the foregoing method according to the first aspect.

According to a fourth aspect, a readable non-volatile storage medium for storing a computer instruction is provided, where the computer instruction is executed by the communications apparatus described in the third aspect or the fourth aspect to implement the foregoing method described in the first aspect.

In the embodiments provided in the present invention, the requester (for example, the STA) in time measurement randomly generates the SIFS within the specified fluctuation range of the nominal SIFS, and the randomly generated SIFS is used as the short interframe spacing between the measurement frame and the acknowledgement frame. This can prevent the location of the requester from being learned by the responder (for example, the AP or the system in which the AP is located) that sends the measurement frame, thereby improving privacy of positioning of the requester.

BRIEF DESCRIPTION OF THE DRAWINGS

To describe the technical solutions in the embodiments of the present invention more clearly, the following briefly describes the accompanying drawings required for describing the embodiments.

DETAILED DESCRIPTION OF ILLUSTRATIVE EMBODIMENTS

Terms used in embodiments of the present invention are merely used to explain the specific embodiments of the present invention, but are not intended to limit the present invention.

A basic concept, a short interframe spacing (SIFS), in the embodiments of the present invention is first described.

According to an IEEE 802.11 standard, there needs to be a specific spacing between consecutive frames, so that after receiving a frame, a device has time to perform necessary processing, for example, receive/transmit turnaround, physical-layer processing, and MAC-layer processing. In an interaction process, a spacing time between two adjacent frames is referred to as a SIFS. Specifically, the SIFS is a time from an end of a last symbol in a current frame to a start of a first symbol in a preamble sequence of a next frame.

Figure 1A:
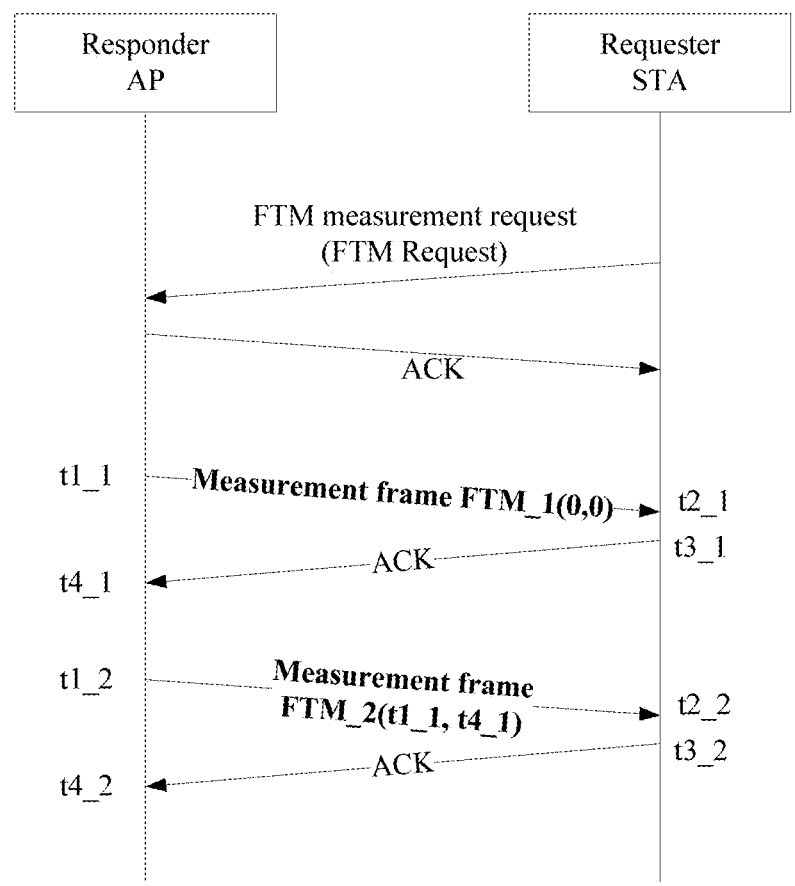
FIG. 1A is a schematic diagram of a measurement process of fine time measurement.
Figure 1B:
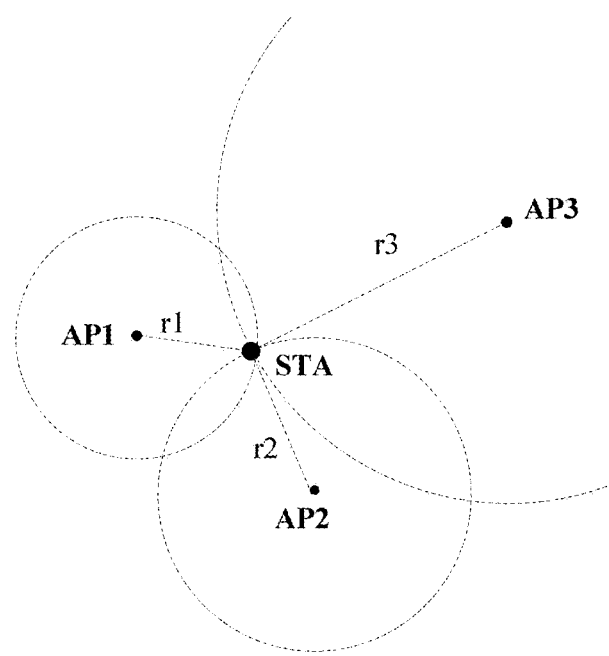
FIG. 1B is a schematic diagram of time measurement—based trilateration.
Figure 1C:
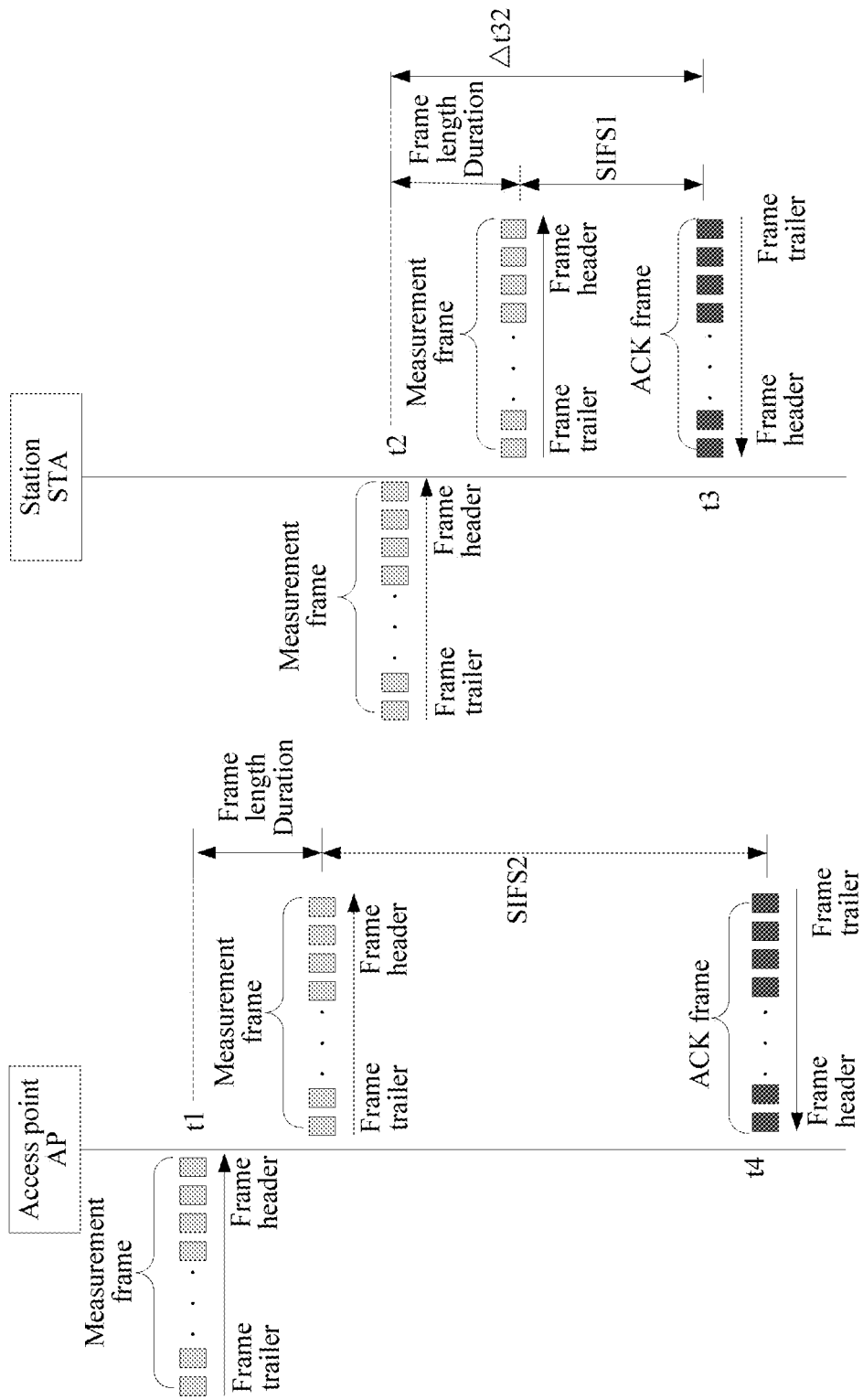
FIG. 1C is a schematic diagram of a time relationship in a time measurement process according to an embodiment of the present invention.

According to the IEEE 802.11 standard, after receiving a measurement frame for FTM, a requester (for example, a STA) needs to perform verification on the measurement frame, and returns an ACK frame if the verification succeeds, as shown in FIG. 1C. Based on the foregoing definition of the SIFS, a time spacing from an end of a last symbol in the measurement frame for FTM to a start of a first symbol in the ACK frame needs to be a time of one SIFS, for example, 16 microseconds.

It should be understood that, as shown in FIG. 1C, because a frame needs to be propagated for a period of time in a propagation medium (for example, air), a SIFS actually measured at a location close to a responder (for example, an AP) is greater than a SIFS actually measured at a location close to the requester (for example, the STA). Particularly, a SIFS actually measured at the requester (for example, the STA) is smallest (for example, a SIFS1 in FIG. 1C) and is represented as a SIFS(min), and a SIFS actually measured at the responder (for example, the AP) is greatest (for example, a SIFS2 in FIG. 1C) and is represented as a SIFS(max). A relationship between the SIFS(max) and the SIFS(min) may be represented as follows: SIFS(max)=SIFS(min)+2*ToF, where ToF is a time of a one-way flight of a message (the measurement frame or the ACK frame) between the responder and the requester.

According to the IEEE 802.11 standard, an interframe spacing that is actually measured in the propagation medium and that is defined as a SIFS may fluctuate relative to a nominal SIFS (hereinafter referred to as aSIFSTime), but a magnitude of the fluctuation cannot exceed ±10%×(aSlotTime−aAirPropagationTime).

It should be understood that, in the embodiments of the present invention, if the following conditions, (SIFS(max)−aSIFSTime)≤10%×(aSlotTime−aAirPropagationTime) and (SIFS(min)−aSIFSTime)≥−10%×(aSlotTime−aAirPropagationTime), can be met, all SIFSs measured at other locations in the propagation medium can meet the foregoing stipulation of the protocol.

In the embodiments of the present invention, the aSlotTime is referred to as a slot time, and is a time required for a process of a series of necessary-for-communication actions, for example, receive/transmit turnaround and clear channel assessment. Specifically, IEEE 802.11 stipulates that aSlotTime=aCCATime+aRxTxTurnaroundTime+aAirPropagationTime+MACProcessingDelay, where aCCATime, aRxTxTurnaroundTime, aAirPropagationTime, and MACProcessingDelay all are physical-layer feature parameters. aCCATime is a minimum time required for determining, when a service is accessed in each timeslot by using a CCA (clear channel assessment, English: Clear Channel Assessment) mechanism, whether the service is busy or idle; to be specific, aCCATime is a CCA delay. aRxTxTurnaroundTime is a transition time required for transitioning from a receive (Rx) mode to a transmit (Tx) mode, to be specific, a receive/transmit turnaround delay. aAirPropagationTime is a propagation time of a signal in the air, and is equivalent to twice a time required for the signal to pass through a maximum distance allowed between timeslot-synchronous STAs. MACProcessingDelay is a MAC processing delay.

It can be understood that aSlotTime−aAirPropagationTime=aCCATime+aRxTxTurnaroundTime+MACProcessingDelay, and a value of aSlotTime−aAirPropagationTime is a sum of delays that is defined at a physical layer and may be represented as a delay below. To be specific, a fluctuation magnitude of a SIFS actually measured in the propagation medium relative to the nominal SIFS cannot exceed ±10%×Delay.

For example, at a channel width of 20 MHz, aSIFSTime is equal to 16 microseconds, and the delay is equal to 9 microseconds. Then, an allowed minimum value of a SIFS actually measured in the propagation medium is 15.1 (=16−10%×9) microseconds, and an allowed maximum value of the SIFS is 16.9 (=16+10%×9) microseconds.

Each version of IEEE 802.11 defines nominal values (nominal value) of aSIFSTime, aSlotTime, and aAirPropagationTime. The following table lists nominal values of the three parameters defined in the 802.11a standard.

TABLE 1

| Parameter | Nominal value (20 MHz) | Nominal value (10 MHz) | Nominal value (5 MHz) |
|---|---|---|---|
| aSlotTime | If a parameter dot11OperatingClassesRequired is false, a value is 9 microseconds; or if a parameter dot11OperatingClassesRequired is true, a value is 9 microseconds plus aAirPropagationTime. | If the parameter dot11OperatingClassesRequired is false, a value is 13 microseconds; or if the parameter dot11OperatingClassesRequired is true, a value is 13 microseconds plus aAirPropagationTime. | If the parameter dot11OperatingClassesRequired is false, a value is 21 microseconds; or if the parameter dot11OperatingClassesRequired is true, a value is 21 microseconds plus aAirPropagationTime. |
| aSIFSTime | 16 microseconds | 32 microseconds | 64 microseconds |
| aAirPropagation Time | If the parameter dot11OperatingClassesRequired is false, a value is 0 microseconds. If the parameter dot11OperatingClassesRequired is true, a value depends on a value of Coverage Class. For details, refer to a table: "Coverage Class field parameters". | | |

It can be learned from Table 1 that for a specified channel, aSlotTime−aAirPropagationTime is always a fixed value. For example, at a channel bandwidth of 20 MHz, aSlotTime−aAirPropagationTime is equal to 9 microseconds. At a channel bandwidth of 10 MHz, aSlotTime−aAirPropagationTime is equal to 13 microseconds. At a channel bandwidth of 5 MHz, aSlotTime−aAirPropagationTime is equal to 21 microseconds. In other words, the foregoing delay is a fixed delay.

For use of the parameter dot11OperatingClassesRequired in Table 1 and a definition and use of Coverage Class, refer to IEEE 802.11. Details are not described herein.

Figure 2:
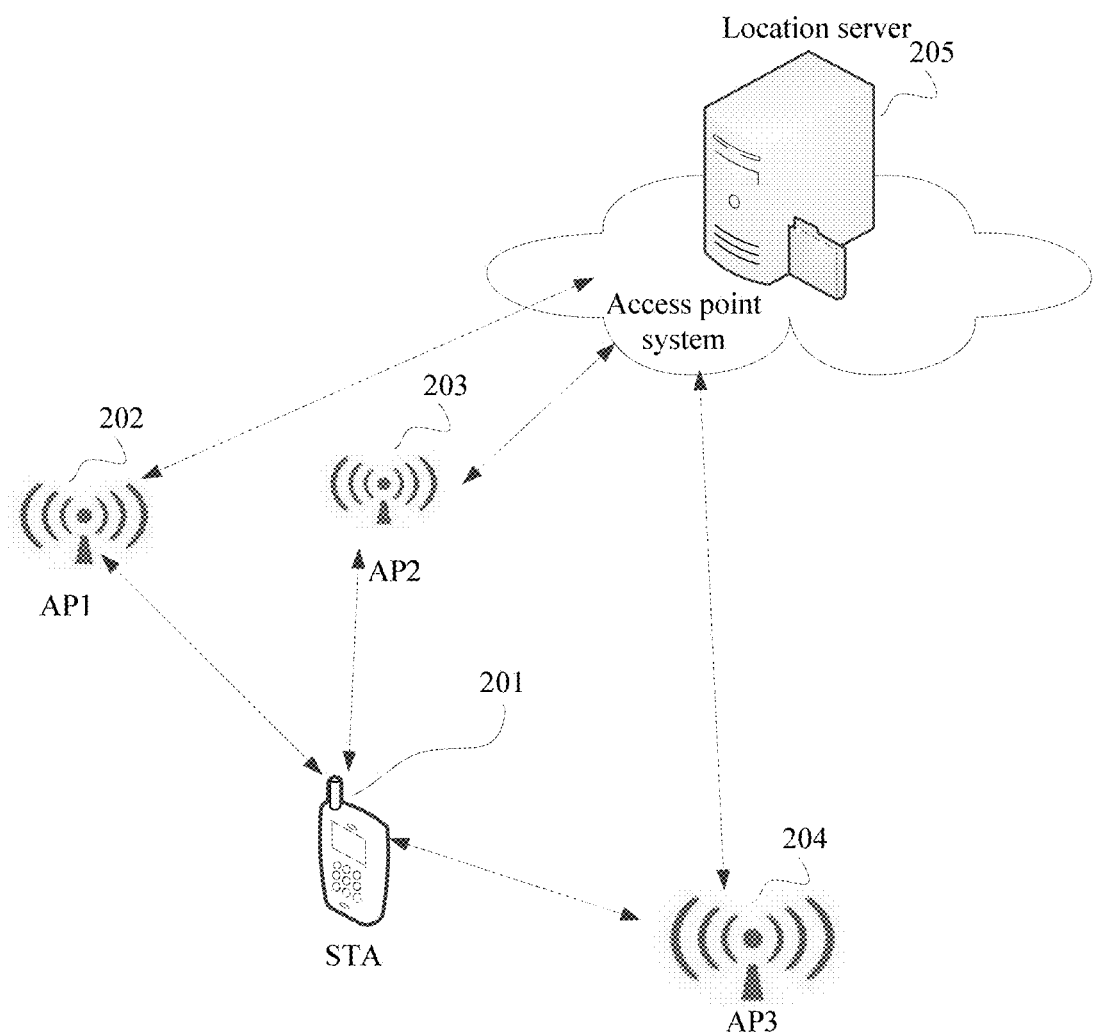
FIG. 2 is a schematic architectural diagram of a communications system for time measurement according to an embodiment of the present invention.

FIG. 2 is a schematic diagram of an FTM communications system 200 according to an embodiment of the present invention. As shown in FIG. 2, the communications system 200 may include a station 201 and a plurality of wireless access points such as an access point 202, an access point 203, and an access point 204, that can perform wireless communication. The station 201 is located in a communication coverage area of the plurality of wireless access points and can separately communicate with the plurality of wireless access points. It should be noted that the communications system 200 may further include a station other than the station 201, and the communications system 200 may further include at least three wireless access points. The plurality of wireless access points in the communications system 200 may form an access point system. A location server 205 may be configured for the access point system, to manage data that is recorded by the plurality of wireless access points when performing time measurement with the station 201.

The station 201 may be a mobile communications device, for example, a cellular phone, a smartphone, a notebook computer, a tablet computer, a personal digital assistant, or another electronic device that can perform wireless communication. The access point in the figure may be a base station, a wireless router, or the like.

In this embodiment of the present invention, the station 201 may be a requester (Initiator) in time measurement, and the plurality of access points may be responders (Responder) in time measurement. A time measurement process between the station 201 and the plurality of access points may be as follows: The station 201 may send a time measurement request (FTM Request) to the access point 202, and the access point 202 responds to the request and returns an acknowledgement (ACK) to the station 201. Then, the access point 202 sends a measurement frame (FTM measurement frame) to the station 201. After finishing receiving the measurement frame, the station 201 returns an ACK frame to the access point 202 after waiting for a SIFS. Similarly, the station 201 may perform a same time measurement process with each of the access point 203 and the access point 204. Finally, under a condition that a location of each access point is known, the station 201 calculates a location of the station 201 based on measurement results (including time stamps t1, t2, t3, and t4) obtained by separately performing time measurement with the access points. The time stamp t1 represents a time at which the access point 202 sends the measurement frame, t2 represents a time at which the station 201 receives the measurement frame, t3 represents a time at which the station 201 sends the ACK frame in response to the measurement frame, and t4 represents a time at which the access point 202 receives the ACK frame.

In this embodiment of the present invention, the access points may broadcast their respective location information in a broadcast manner, so that the station 201 can learn about the location information of each access point. In some embodiments, the access points may alternatively send their respective location information to the station 201 in a point-to-point communication manner. A manner in which the station 201 learns about the location information of each access point is not limited herein.

Based on the communications system shown in FIG. 2, an embodiment of the present invention provides a time measurement—based positioning method. A main principle related to the method is as follows: As shown in FIG. 2, a requester (for example, a STA) separately performs time measurement with a plurality of responders (for example, APs) and calculates a location of the requester based on a measurement result. A measurement result obtained by the requester by performing time measurement with each responder includes time stamps t1, t2, t3, and t4, where t1 is a time at which the responder sends a measurement frame, t2 is a time at which the requester receives the measurement frame, t3 is a time at which the requester sends an acknowledgement frame in response to the measurement frame, and t4 is a time at which the responder receives the acknowledgement frame. The acknowledgement frame is sent by the requester after waiting for a randomly generated short interframe spacing after receiving a last symbol of the measurement frame. The randomly generated short interframe spacing is a short interframe spacing that is actually used by the requester and that is randomly generated by the requester within a specified fluctuation range of a nominal short interframe spacing, and the nominal short interframe spacing (Nominal SIFS) is a short interframe spacing agreed upon between the plurality of APs and the station.

In this embodiment of the present invention, an algorithm for calculating a planimetric location (x, y) of the requester (for example, the STA) is as follows:

$$\begin{cases} \sqrt{(x_{AP1}-x)^2+(y_{AP1}-y)^2} = C*[(t4_{AP1}-t1_{AP1})-(t3_{AP1}-t2_{AP1})]/2 \\ \sqrt{(x_{AP2}-x)^2+(y_{AP2}-y)^2} = C*[(t4_{AP2}-t1_{AP2})-(t3_{AP2}-t2_{AP2})]/2 \\ \sqrt{(x_{AP3}-x)^2+(y_{AP3}-y)^2} = C*[(t4_{AP3}-t1_{AP3})-(t3_{AP3}-t2_{AP3})]/2 \end{cases},$$

where $t1_{AP1}$, $t2_{AP1}$, $t3_{AP1}$, and $t4^{AP1}$ are measurement results obtained by the requester (for example, the STA) by performing time measurement with a responder AP1, and ($x_{AP1}$, $y_{AP1}$) is a location of the responder AP1; $t1_{AP2}$, $t2_{AP2}$, $t3_{AP2}$, and $t4_{AP2}$ are measurement results obtained by the requester (for example, the STA) by performing time measurement with a responder AP2, and ($x_{AP2}$, $y_{AP2}$) is a location of the responder AP2; and $t1_{AP3}$, $t2_{AP3}$, $t3_{AP3}$, and $t4_{AP3}$ are measurement results obtained by the requester (for example, the STA) by performing time measurement with a responder AP3, and ($x_{AP3}$, $y_{AP3}$) is a location of the responder AP3. It should be noted that the AP1 to the AP3 in the algorithm expression may be any three of the plurality of responders.

The foregoing algorithm expression may be extended to calculating a location of the requester in three-dimensional space. During positioning in the three-dimensional space, a formula for calculating a distance between the requester (for example, the STA) and another responder (for example, an AP) further needs to be obtained. To be specific, results of time measurement separately performed by the requester (for example, the STA) with at least four responders (for example, APs) are needed to calculate the location of the requester (for example, the STA). An algorithm for calculating the location (x, y, z) of the requester (for example, the STA) in the three-dimensional space may be as follows:

$$\begin{cases} \sqrt{(x_{AP1}-x)^2+(y_{AP1}-y)^2+(z_{AP1}-z)^2} = C*\frac{[(t4_{AP1}-t1_{AP1})-(t3_{AP1}-t2_{AP1})]}{2} \\ \sqrt{(x_{AP2}-x)^2+(y_{AP2}-y)^2+(z_{AP2}-z)^2} = C*\frac{[(t4_{AP2}-t1_{AP2})-(t3_{AP2}-t2_{AP2})]}{2} \\ \sqrt{(x_{AP3}-x)^2+(y_{AP3}-y)^2+(z_{AP3}-z)^2} = C*\frac{[(t4_{AP3}-t1_{AP3})-(t3_{AP3}-t2_{AP3})]}{2} \\ \sqrt{(x_{AP4}-x)^2+(y_{AP4}-y)^2+(z_{AP4}-z)^2} = C*\frac{[(t4_{AP4}-t1_{AP4})-(t3_{AP4}-t2_{AP4})]}{2} \end{cases},$$

where ($x_{APj}$, $y_{APj}$, $z_{APj}$) is a location of a responder APj (j=1, 2, 3, 4) in the three-dimensional space; and $t1_{APj}$, $t2_{APj}$, $t3_{APj}$, and $t4_{APj}$ are measurement results obtained by the requester (for example, the STA) by performing time measurement with the responder APj.

In specific implementation, the requester (for example, the STA) may calculate the location of the requester by using a measurement result (t1_i, t2_i, t3_i, and t4_i) of $i^{th}$ FTM measurement (where i is a positive integer). The responder (for example, an AP or a system in which an AP is located) may estimate the location of the requester by using t1_i and t4_i recorded in a process of the $i^{th}$ FTM measurement and by using a formula: (t3_i–t2_i)=Length of a measurement frame of the $i^{th}$ FTM+Nominal SIFS.

It can be learned by referring to FIG. 1A that, for measurement results t1_i, t2_i, t3_i, and t4_i of the $i^{th}$ FTM measurement, t2_i and t3_i are recorded by the requester (for example, the STA), and t1_i and t4_i are recorded by the responder (for example, the AP). The responder (for example, the AP) needs to add t1_i and t4_i to a measurement frame FTM_i+1 of $(i+1)^{th}$ FTM in a process of the $(i+1)^{th}$ FTM measurement, to send t1_i and t4_i to the requester (for example, the STA). In specific implementation, the requester (for example, the STA) may wait until the measurement frame FTM_i+1 (which carries t1_i and t4_i) of the $(i+1)^{th}$ FTM is received, and then calculate the location of the requester by using the measurement results of the $i^{th}$ FTM measurement.

Figure 3:
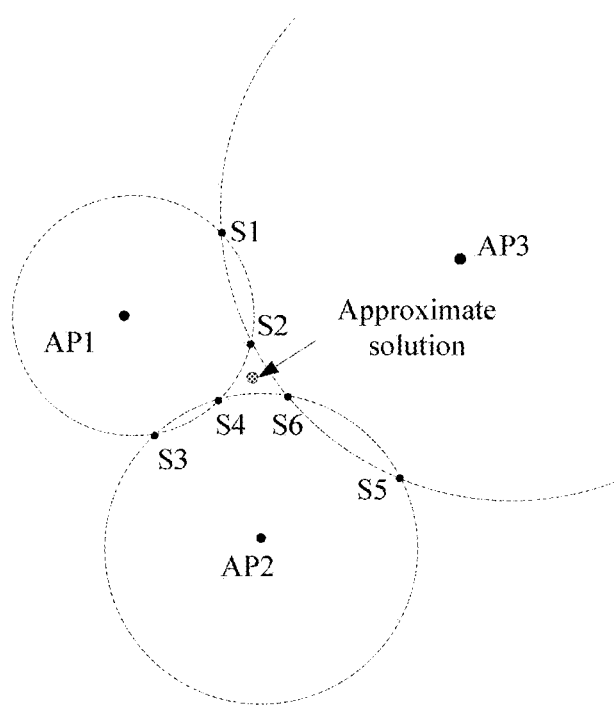
FIG. 3 is a schematic diagram of producing an approximate solution by using trilateration.

It should be noted that various measurement errors exist, for example, a clock of the requester and a clock of the responder are asynchronous; therefore, an accurate solution, that is, a point of intersection of three circles, shown in FIG. 1B cannot be obtained by calculating the location of the requester (for example, the STA) by using the foregoing algorithm. In a possible case, a solving procedure of the foregoing algorithm may be shown in FIG. 3. Three circles centered at an AP1, an AP2, and an AP3 do not intersect at one point. For example, every two of the three circles centered at the AP1, the AP2, and the AP3 intersect at two points, for example, S1 to S6 in the figure. In other words, from a perspective of equation solving, there is no solution to an equation set corresponding to the foregoing algorithm. In actual application, for such a case in which there is no solution, the location of the requester may be estimated by calculating an approximate value. For example, for the case shown in FIG. 3 in which there is no solution, a central location of three points of intersection (S2, S4, and S6) that are closer to each other may be determined as an approximate solution, and the approximate solution is determined as the location of the requester. It should be noted that an approximate-solution calculation method used for the foregoing case in which there is no solution is not limited in this embodiment of the present invention.

The following describes in detail how the requester (for example, the STA) randomly generates the actually used short interframe spacing within the specified fluctuation range of the nominal short interframe spacing.

In this embodiment of the present invention, the nominal short interframe spacing agreed upon between the plurality of responders (for example, the APs) and the requester (for example, the STA) is aSIFSTime defined in a standard IEEE 802.11. For a nominal value of aSIFSTime, refer to the foregoing descriptions.

Under a condition that IEEE 802.11 is complied with (a fluctuation magnitude of a SIFS actually measured in a propagation medium relative to the nominal SIFS cannot exceed ±10%×Delay), the specified fluctuation range of the nominal short interframe spacing in this embodiment of the present invention may include a first interface [aSIFSTime–A1, aSIFSTime] and/or a second interval [aSIFSTime, aSIFSTime+A2]. A1 is a maximum magnitude by which the randomly generated short interframe spacing can be shortened relative to the nominal short interframe spacing aSIFSTime, and A2 is a maximum magnitude by which the randomly generated short interframe spacing can be prolonged relative to the nominal short interframe spacing. In actual application, the specified fluctuation range may be alternatively a subset of the first interval, a subset of the second interval, or a union set of these subsets.

Specifically, A1 and A2 are positive numbers, and the delay is a fixed sum of delays that is defined at a physical layer.

It can be learned from the foregoing that a minimum SIFS (which is represented as a SIFS(min)) actually measured in the propagation medium is a SIFS actually measured at the requester (for example, the STA), and a maximum SIFS (which is represented as a SIFS(max)) actually measured in the propagation medium is a SIFS actually measured at the responder (for example, the AP). The SIFS(min) is a SIFS actually used by the requester. A relationship between the SIFS(min) and the SIFS(max) may be represented as follows: SIFS(max)=SIFS(min)+2*ToF, where The ToF is a time of a one-way flight of a message between the requester and the responder.

It should be understood that if the following conditions, (SIFS(max)−aSIFSTime)≤10%×Delay and (SIFS(min)−aSIFSTime)≥−10%×Delay, can be met, a SIFS measured at any location in the propagation medium can comply with IEEE 802.11.

In order to comply with IEEE 802.11, selection of A1 in this embodiment of the present invention needs to meet the following condition: A1≤10%×Delay. Under a condition that A1≤10%×Delay is met, a SIFS(min) that is randomly generated by the requester and that is within the first interval can make a SIFS measured at any location in the propagation medium comply with IEEE 802.11. A specific deduction process is as follows:

In a first aspect, a minimum value that is of the randomly generated SIFS(min) within the first interval and that can be possibly obtained=aSIFSTime−10%×Delay, and fluctuation of the SIFS(min) relative to the nominal SIFS is SIFS(min)−aSIFSTime=−10%×Delay≥−10%×Delay. In this case, fluctuation of a SIFS(max) relative to the nominal SIFS is SIFS(max)−aSIFSTime=SIFS(min)+2*ToF−aSIFSTime=2*ToF−10%×Delay≤10%×Delay.

In a second aspect, a maximum value that is of the randomly generated SIFS(min) within the first interval and that can be possibly obtained=aSIFSTime, and fluctuation of the SIFS(min) relative to the nominal SIFS is SIFS(min)−aSIFSTime=0≥−10%×Delay. In this case, fluctuation of a SIFS(max) relative to the nominal SIFS is SIFS(max)−aSIFSTime=2*ToF. Restricted by an effective propagation distance (about 100 meters) of WiFi, 2*ToF (about 0.6 μs) is usually less than 10%×Delay. For example, at a channel width of 20 MHz, Delay=9 μs, and 10%×Delay=0.9 μs>0.6 μs.

Similar to the foregoing deduction process, a minimum value that is of a randomly generated SIFS(min) within the second interval and that can be possibly obtained=aSIFSTime, and fluctuation of the SIFS(min) relative to the nominal SIFS is SIFS(min)−aSIFSTime=0≥−10%×Delay. In this case, fluctuation of a SIFS(max) relative to the nominal SIFS is SIFS(max)−aSIFSTime=2*ToF<10%×Delay.

Similar to the foregoing deduction process, a maximum value that is of the randomly generated SIFS(min) within the second interval and that can be possibly obtained=aSIFSTime+A2, and fluctuation of the SIFS(min) relative to the nominal SIFS is SIFS(min)−aSIFSTime=A2≤10%×Delay. In this case, fluctuation of a SIFS(max) relative to the nominal SIFS is SIFS(max)−aSIFSTime=2*ToF+A2. In order to comply with IEEE 802.11, selection of A2 in this embodiment of the present invention needs to further meet the following condition: 2*ToF+A2≤10%*Delay, where ToF=Distance/C, the distance represents a distance between the requester and the responder, and C represents a speed of light.

Finally, the foregoing inequality may be simplified to A2≤10%*Delay−2*Distance/C. In other words, a maximum value that can be selected for A2 is related to the distance. Specifically, the maximum value that can be selected for A2 decreases as the distance between the requester and the responder increases, and increases as the distance between the requester and the responder decreases. Particularly, when the distance between the requester and the responder is less than a preset distance threshold (for example, five meters), it may be determined that the requester approximately coincides with the responder. In this case, A2≤10%*Delay.

In specific implementation, the requester may estimate the distance based on signal strength of the measurement frame. For details about how to estimate a distance between two communication nodes based on signal strength, refer to a channel model algorithm. Details are not described herein.

It can be understood that if the randomly generated short interframe spacing is randomly generated by the requester (for example, the STA) within the first interval, it indicates that, after finishing receiving the measurement frame, the requester (for example, the STA) sends, to the responder (for example, the AP) in advance relative to the nominal short interframe spacing defined in the protocol, the ACK frame in response to the measurement frame. If the randomly generated short interframe spacing is randomly generated by the requester (for example, the STA) within the second interval, it indicates that, after finishing receiving the measurement frame, the requester (for example, the STA) postpones, relative to the nominal short interframe spacing defined in the protocol, sending the ACK frame in response to the measurement frame to the responder (for example, the AP).

Specifically, a time of advancement or postponement cannot exceed 10%×Delay. For example, at a channel width of 20 MHz defined in an 802.11a standard, aSIFSTime=16 μs, Delay=9 μs, and 10%×Delay=10%×9 μs=0.9 μs. In other words, the requester can advance or postpone, by a maximum of 0.9 μs relative to the nominal short interframe spacing, sending the ACK frame in response to the measurement frame.

During specific implementation, in order to reserve a sufficient delay time for signal receiving, sending, and processing, for example, a receive/transmit turnaround delay and a MAC processing delay, the SIFS randomly generated by the requester (for example, the STA) cannot be advanced by too much time relative to the nominal SIFS. Optionally, A1≤w*10%×Delay, and 0<w<1, where w may be an experience weight. In actual application, a value of w may be determined based on a specific delay status of the communications system. For example, when aSIFSTime=16 μs, Delay=9 μs, and an actually measured total delay of the communications system is 15.55 μs, a value of w may be 0.5. In this case, A1≤5%×Delay. To be specific, the SIFS randomly generated by the requester can be advanced by a maximum of 5%×Delay=0.45 μs relative to the nominal SIFS. The example is merely used to explain this embodiment of the present invention, but does not constitute any limitation.

It can be understood that a spacing time that is between the measurement frame and the ACK frame in response to the measurement frame and that is used by the requester (for example, the station) is not the nominal short interframe spacing stipulated in the protocol, but is randomly generated within the specified fluctuation range of the nominal short interframe spacing. Therefore, the responder (for example, the AP) cannot accurately calculate a value of a time stamp (t3−t2) based on the nominal short interframe spacing, and consequently, cannot accurately estimate the location of the requester (for example, the station). This improves privacy of positioning of the station.

For example, at a channel width of 20 MHz defined in the 802.11a standard, aSIFSTime=16 μs, Delay=9 μs, and 10%× Delay=10%×9 μs=0.9 μs. Assuming that the short interframe spacing randomly generated by the requester (for example, the station) is $SIFS_{random}$=Random[aSIFSTime−A1, aSIFSTime]=aSIFSTime−5%×9 μs, it indicates that the SIFS used by the requester fluctuates by −450 ns (nanoseconds) relative to the nominal SIFS (aSIFSTime), and the requester returns the ACK frame to the responder (for example, the AP) in advance by 450 ns. If the responder still calculates the location of the requester based on the nominal SIFS (aSIFSTime), a deviation between a distance from the requester to the responder calculated by the responder and an actual distance from the requester to the responder is: −450 ns*Speed of light C=−135 m (where the negative value indicates that the calculated value is closer than the actual value).

Similarly, if the SIFS used by the requester fluctuates by a positive value relative to the nominal SIFS (aSIFSTime), a distance from the requester to the responder calculated by the responder is farther than an actual distance from the requester to the responder, and a positive value indicates that the calculated value is farther than the actual value.

It should be understood that in a process in which the requester (for example, the STA) performs time measurement with the plurality of responders (for example, the APs), all SIFSs actually used by the requester fluctuate by a positive value or a negative value to different extent, relative to the nominal SIFS. In this way, when one responder uses a measurement result of another responder to estimate the location of the requester, there is a relatively large deviation between an estimated location and an actual location of the requester. In addition, a degree and a direction of such a deviation are both uncertain. For example, the deviation of the estimated location from the actual location may be represented as: The estimated location is northeast of the actual location, and a distance between the estimated location and the actual location is 100 meters. The example is merely used to explain this embodiment of the present invention, and shall not constitute any limitation.

Figure 4:
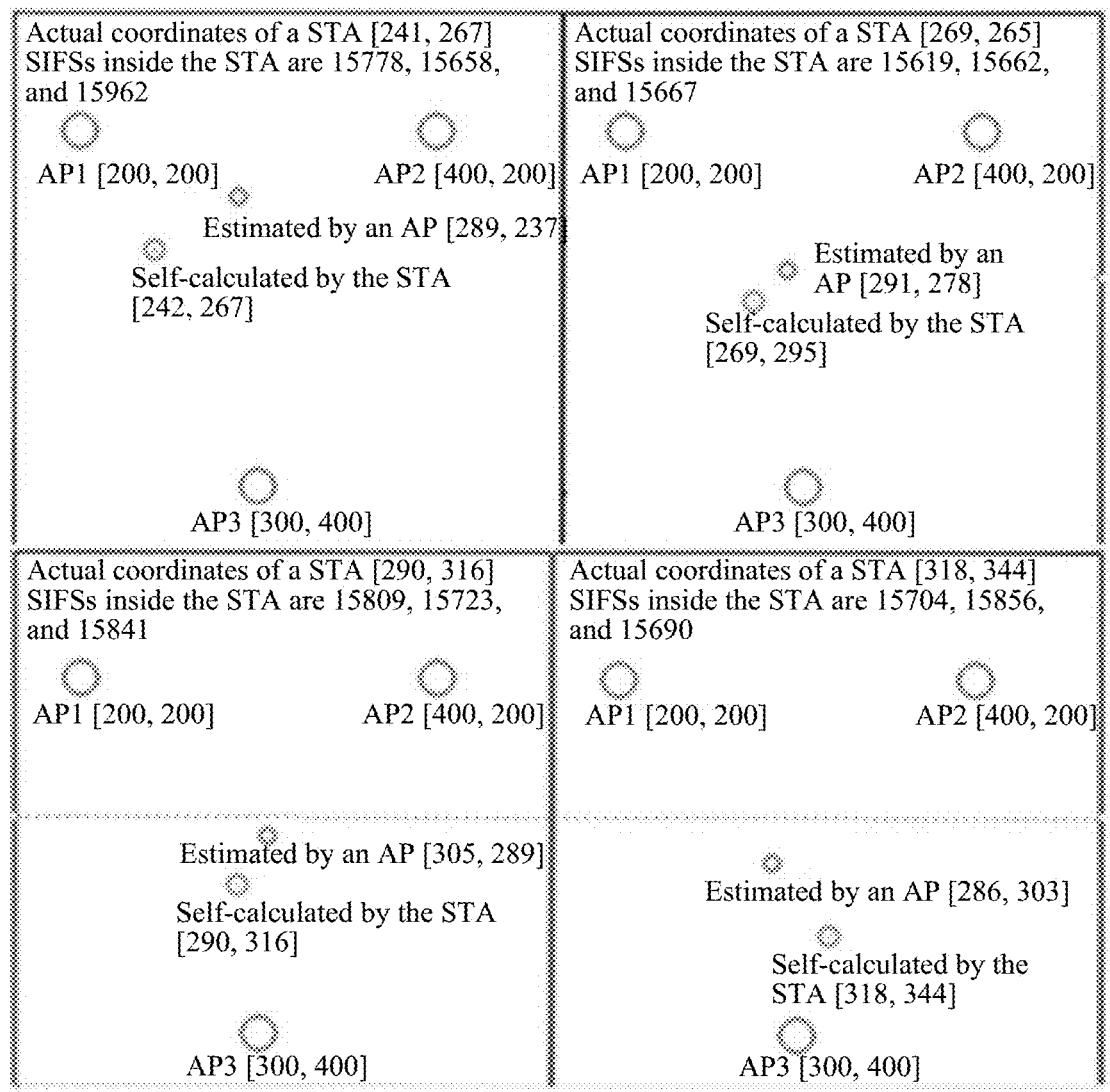
FIG. 4 is a schematic simulation diagram of four groups of time measurement according to an embodiment of the present invention.

FIG. 4 shows four groups of simulation results of positioning through time measurement between a STA and three APs. Coordinates of an AP1 are (200, 200), coordinates of an AP2 are (400, 200), and coordinates of an AP3 are (300, 400), where a unit is meter. Of the coordinate axes (not shown), an X-axis direction increases to the right, and a Y axis increases downwards. In each group of simulation, actual coordinates of the STA and randomly generated SIFSs (unit: nanosecond) respectively used by the STA to perform time measurement with the foregoing three APs are shown in an upper left corner. In these four groups of simulation results, a nominal SIFS is 16 microseconds, that is, 16000 nanoseconds.

In the simulation results, "self-calculated by the STA" indicates a location of the STA calculated by the STA based on measurement results obtained by separately performing time measurement with the three APs (the AP1, the AP2, and the AP3); and "estimated by an AP" indicates a location of the STA calculated by the AP (any one of the three APs) or a location server (for example, the location server 205 shown in FIG. 2) in an AP system based on time stamps t1 and t4 recorded when the three APs separately perform time measurement with the STA and based on a formula that t3−t2=Length of a measurement frame+Nominal SIFS.

It can be seen from FIG. 4 that a result "self-calculated by the STA" approximates to actual coordinates of the STA, and there is a relatively large difference between a result "estimated by an AP" and the actual coordinates of the STA. In addition, as the location of the STA changes, there is also a relatively large deviation between a change track of a location "estimated by an AP" and an actual movement track of the STA. It can be seen from the simulation results provided in FIG. 4 that a SIFS is randomly generated by the STA within a specified fluctuation range of a nominal SIFS, so that there is a relatively large deviation between the STA location estimated by the AP and the actual location of the STA, thereby protecting privacy of the location of the STA.

Figure 5:
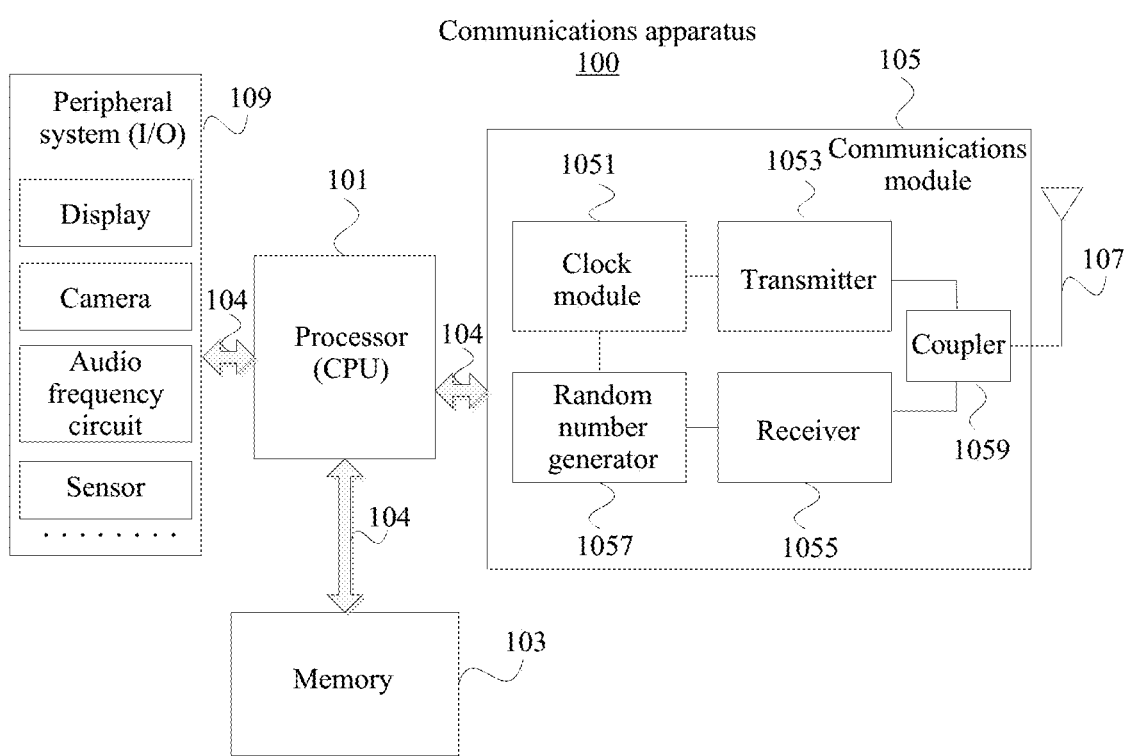
FIG. 5 is a schematic diagram of a hardware architecture of a communications apparatus according to an embodiment of the present invention.

Based on a same inventive idea, an embodiment of the present invention further provides a communications apparatus, configured to implement a function of the requester (for example, the STA) in the foregoing. FIG. 5 is a diagram of a hardware architecture of a communications apparatus according to an embodiment of the present invention. As shown in FIG. 5, the communications apparatus 100 may include a processor 101, a memory 103 (one or more computer readable storage media), a communications module 105, and a peripheral system 105. These components may communicate on one or more communications buses 114.

The communications module 105 is configured to receive and send a radio frequency signal and communicate with another communications device by using the radio frequency signal and a communications network. In specific implementation, the communications module 105 may include but is not limited to a clock module 1051, a transmitter 1053, a receiver 1055, and a random number generator 1057; and may further include a coupler 1059 that is coupled to the receiver 1055 and the transmitter 1053 and that is configured to allocate power, and an antenna 107 coupled to the communications module 105. In this embodiment of the present invention, the transmitter 1053 may be configured to send an FTM measurement request to a responder (for example, an AP) in FTM measurement. The receiver 1055 may be configured to receive an FTM measurement frame sent by the responder and record a receiving time t2. The random number generator 1057 may be configured to randomly generate a SIFS within a specified fluctuation range of a nominal SIFS. The clock module 1051 may be configured to wait for the SIFS randomly generated by the random number generator 1057. The transmitter 1053 may be configured to: when the wait of the clock module 1051 ends, send, to the responder, an ACK frame in response to the measurement frame, and record a sending time t3.

It should be noted that some or all of the several components such as the clock module 1051, the transmitter 1053, the receiver 1055, and the random number generator 1057 may be alternatively integrated into one or more modules.

The peripheral system 109 is mainly configured to implement an interaction function between the communications apparatus 100 and a user/an external environment, and mainly includes an input/output apparatus of the communications apparatus 100. In specific implementation, the peripheral system 109 may include but is not limited to a display, a camera, an audio frequency circuit, a sensor, and the like.

The memory 103 is coupled to the processor 101, and the memory 103 may be configured to store data. In this embodiment of the present invention, the memory 103 may be configured to store a measurement result of time measurement, and the processor 101 is configured to calculate a location of the communications apparatus 100 based on measurement results that are obtained by the communications apparatus 100 by separately performing time measurement with at least three responders and that are stored in the memory 103. In specific implementation, the memory 103 may include a high-speed random access memory, and may also include a non-volatile memory, for example, one or more magnetic disk storage devices, flash devices, or other non-volatile solid-state storage devices.

Figure 6:
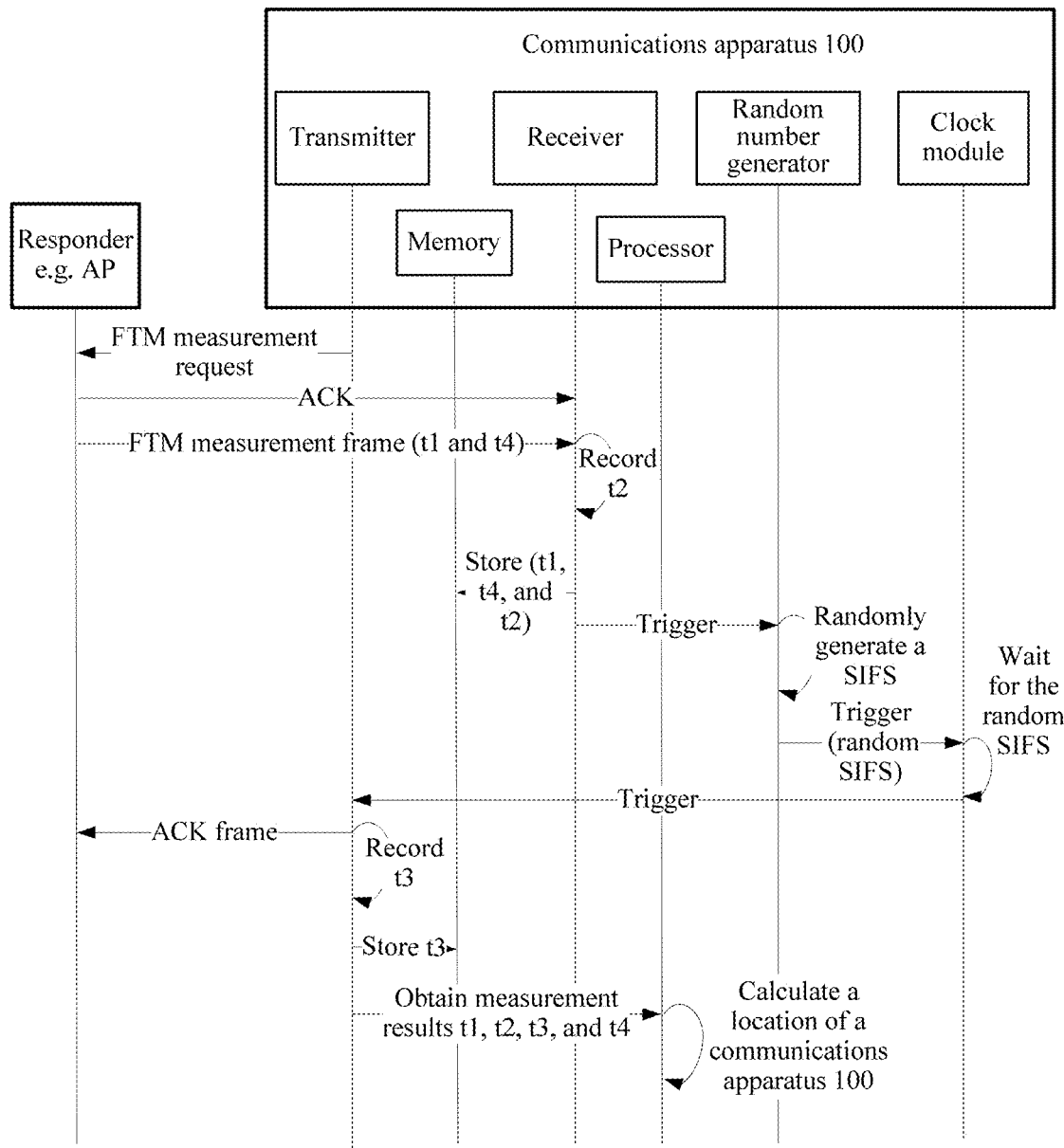
FIG. 6 is a schematic diagram of function modules of a terminal according to an embodiment of the present invention.

The following describes in detail a collaborative relationship between the foregoing components in this embodiment of the present invention. Refer to FIG. 6.

Step 1. The transmitter 1053 sends an FTM measurement request to a responder (for example, an AP) in FTM measurement. Correspondingly, the responder receives the measurement request and returns an acknowledgement (ACK).

Step 2. The receiver 1055 receives the acknowledgement returned by the responder.

Step 3. The receiver 1055 receives an FTM measurement frame sent by the responder and record a receiving time t2, where t2 is generated in a process of the current FTM measurement. The measurement frame may carry t1 and t4 recorded by the responder in previous FTM measurement, to be specific, the time t1 at which the responder sends a previous measurement frame and the time t4 at which the responder receives an acknowledgement frame sent by the requester in response to the previous measurement frame.

Step 4. The receiver 1055 may store time stamps t1, t4, and t2 in the memory 103, and trigger the random number generator 1057 to randomly determine a SIFS.

Step 5. The random number generator 1057 randomly generates a SIFS within the specified fluctuation range of the nominal SIFS, and triggers the clock module 1051 to wait for the randomly generated SIFS.

Step 6. The clock module 1051 waits for a time corresponding to a value of the randomly generated SIFS; and when the wait ends, triggers the transmitter 1053 to send, to the responder, an ACK frame in response to the FTM measurement frame.

Step 7. The transmitter 1053 sends, to the responder, the ACK frame in response to the FTM measurement frame, records a sending time t3, and then may store a time stamp t3 in the memory 103, where t3 is generated in the process of the current FTM measurement.

Finally, the processor 101 may obtain, from the memory 103, complete measurement results (t1, t2, t3, and t4) prior to the process of the current FTM measurement, for example, measurement results of a process of the previous FTM measurement. In addition, the processor 101 may calculate the location of the communications apparatus 100 based on complete measurement results that are obtained by the communications apparatus 100 by separately performing time measurement with a plurality of responders and that are stored in the memory 103.

Specifically, for definitions of the time stamps t1, t2, t3, and t4 in the measurement results, refer to the foregoing.

It should be noted that for content not described in the embodiments of FIG. 5 and FIG. 6, for example, the specified fluctuation range of the nominal SIFS, a specific implementation in which the random number generator 1057 randomly generates a SIFS, and a specific implementation in which the processor 101 calculates the location of the communications apparatus 100, refer to the foregoing. Details are not described herein again.

It should be noted that FIG. 5 is merely an implementation of this embodiment of the present invention. In actual application, the communications apparatus 100 may further include more or fewer components. This is not limited herein.

Figure 7:
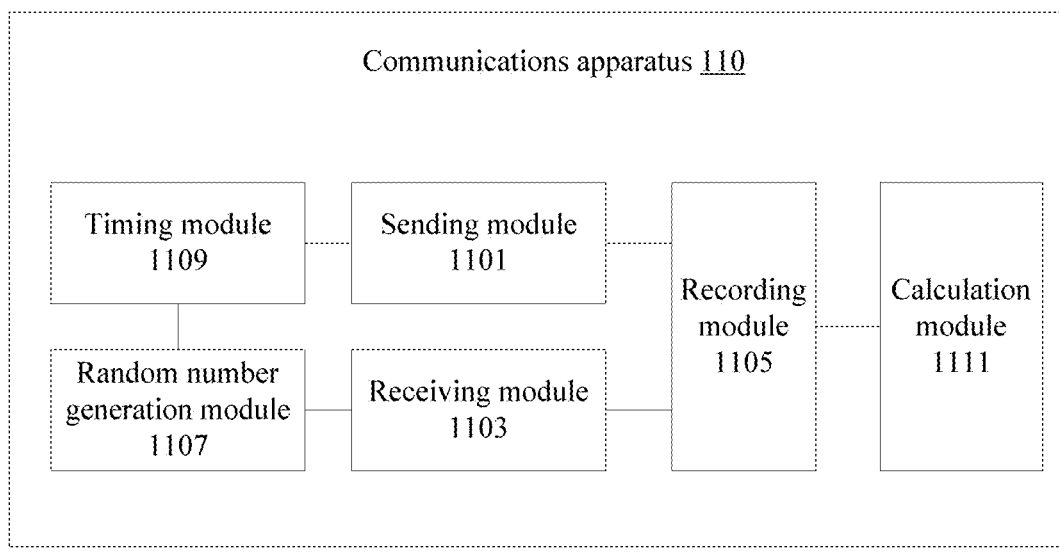
FIG. 7 is a schematic structural diagram of a communications apparatus according to an embodiment of the present invention.

FIG. 7 is a schematic structural diagram of a communications apparatus according to an embodiment of the present invention. The communications apparatus is configured to implement a function of the foregoing requester in the foregoing. As shown in FIG. 7, the communications apparatus no may include a sending module 1101, a receiving module 1103, a recording module 1105, a random number generation module 1107, a timing module 1109, and a calculation module 1111.

The receiving module 1103 is configured to receive a measurement frame sent by a responder.

The random number generation module 1107 is configured to randomly generate a short interframe spacing within a specified fluctuation range of a nominal short interframe spacing, where the nominal short interframe spacing is a short interframe spacing agreed upon between the responder and the requester.

The timing module 1109 is configured to wait for the short interframe spacing randomly generated by the random number generator.

The sending module 1101 is configured to: when the wait of the timing module 1109 ends, send, to the responder, an acknowledgement frame in response to the measurement frame.

The recording module 1105 is configured to record a measurement result generated through time measurement performed by the communications apparatus with the responder.

The calculation module 1111 is configured to calculate a location of the communications apparatus based on measurement results that are obtained by the communications apparatus by separately performing time measurement with a plurality of responders and that are recorded by the recording module 1105.

Specifically, the measurement result includes time stamps t1, t2, t3, and t4. For definitions of the time stamps t1, t2, t3, and t4 in the measurement results, refer to the foregoing.

Specifically, the measurement frame received by the receiving module 1103 may carry t1 and t4 recorded by the responder in a process of previous FTM measurement. Specifically, after the receiving module 1103 receives the measurement frame, the recording module 11055 may be specifically configured to record a time t2 at which the receiving module 1103 receives the measurement frame in a process of current FTM measurement, and record t1 and t4 that are carried in the measurement frame. Specifically, after the sending module 1101 sends the ACK frame, the recording module 1105 may be specifically configured to record a time t3 at which the sending module 1101 sends the ACK frame in the process of the current FTM measurement.

Specifically, the calculation module 1111 may obtain, from the recording module 1105, complete measurement results (t1, t2, t3, and t4) prior to the process of the current FTM measurement, for example, measurement results of a process of previous FTM measurement. In addition, the calculation module 1111 may calculate the location of the communications apparatus no based on the complete measurement results that are obtained by the communications apparatus no by separately performing time measurement with the plurality of responders and that are recorded by the recording module 1105.

Optionally, before the receiving module 1103 receives the measurement frame sent by the responder, the sending module 1101 may be further configured to send an FTM measurement request to the responder. Optionally, the receiving module 1103 may be further configured to receive an acknowledgement returned by the responder in response to the measurement request.

It should be noted that for content not described in the embodiment of FIG. 7, for example, the specified fluctuation range of the nominal SIFS, a specific implementation of the random number generation module 1107, and a specific implementation of the calculation module 1111, refer to the foregoing. Details are not described herein again.

In addition, an embodiment of the present invention further provides a communications system, including a requester and a responder. The requester may be the communications apparatus 100 shown in FIG. 5 or the communications apparatus no shown in FIG. 7, and the responder may be a communications device such as an access point (AP) or a base station. It should be noted that the responder may also be the requester (for example, the STA) mentioned in the content of all the foregoing embodiments. Details are not described herein again.

The positioning method according to the embodiments of the present invention can be used to facilitate determining of a device location in licensed and unlicensed spectral bands by using any network protocol and standard of various network protocols. This includes Wi-Fi communication (for example, Wi-Fi communication promoted by a fixed access point) performed with reference to an IEEE 802.11 standard, 3GPP LTE/LTE-A communication (for example, LTE Direct (LTE-D) communication established in a portion of an uplink segment or in another specified resource), machine-to-machine (M2M) communication performed with reference to an IEEE 802.16 standard, and the like.

By implementing the embodiments of the present invention, the requester (for example, the STA) in time measurement randomly generates the SIFS within the specified fluctuation range of the nominal SIFS, and the randomly generated SIFS is used as the short interframe spacing between the measurement frame and the acknowledgement frame. This can prevent the location of the requester from being learned by the responder (for example, the AP or the system in which the AP is located) that sends the measurement frame, thereby improving privacy of positioning of the requester.

In the foregoing embodiments, a transmitter (namely, a sending module) of the requester (the STA) may further use random regulation-compliant power to send the acknowledgement (ACK) frame, provided that the responder (the AP) can receive the acknowledgement frame. This can ensure that the responder cannot determine a distance from the requester to the responder based on receive power of receiving the acknowledgement frame. In this way, the plurality of responders cannot estimate the location of the requester by exchanging information about the receive power. Therefore, the present invention can better protect privacy of the location of the requester.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of any other programmable data processing device generate an apparatus for implementing a specified function in one or more processes in the flowcharts and/or in one or more blocks in the block diagrams.

These computer program instructions may be alternatively stored in a computer readable memory that can instruct a computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations of the present invention, provided that these modifications and variations fall within the scope of protection defined by the claims of the present invention and equivalent technologies thereof.

What is claimed is:

1. A method, comprising:
separately performing, by a first device, time measurement with a plurality of second devices, to obtain a plurality of measurement results, wherein each of the plurality of measurement results corresponds to a respective second device of the plurality of second devices; and
calculating a location of the first device based on the plurality of measurement results, wherein a first measurement result of the plurality of measurement results comprises time stamps t1, t2, t3, and t4, t1 is a time at which a respective second device corresponding to the first measurement result sends a measurement frame, t2 is a time at which the first device receives the measurement frame from the respective second device corresponding to the first measurement result, t3 is a time at which the first device sends an acknowledgement frame in response to the measurement frame received from the respective second device corresponding to the first measurement result, t4 is a time at which the respective second device corresponding to the first measurement result receives the acknowledgement frame, the acknowledgement frame is sent by the first device after waiting for a randomly generated short interframe spacing after receiving a last symbol of the measurement frame received from the respective second device corresponding to the first measurement result, the randomly generated short interframe spacing is a short interframe spacing that is actually used by the first device and that is randomly generated by the first device and is within a specified fluctuation range of a nominal short interframe spacing, and the nominal short interframe spacing is a short interframe spacing agreed upon between the plurality of second devices and the first device.

2. The method according to claim 1, wherein the specified fluctuation range of the nominal short interframe spacing is within a first interval or a second interval, wherein the first interval is between aSIFSTime−A1 and aSIFSTime, the second interval is between aSIFSTime and aSIFSTime+A2, A1 is a maximum magnitude by which the randomly generated short interframe spacing can be shortened relative to the nominal short interframe spacing aSIFSTime, A2 is a maximum magnitude by which the randomly generated short interframe spacing can be prolonged relative to the nominal short interframe spacing, and A1 and A2 are both positive numbers.

3. The method according to claim 2, wherein A1≤10%*Delay, the delay is a fixed sum of delays that is defined at a physical layer, Delay=aCCATime+aRxTxTurnaroundTime+MACProcessingDelay, aCCATime is a clear channel assessment delay, aRxTxTurnaroundTime is a receive/transmit turnaround delay, and MACProcessingDelay is a media access control (MAC) layer processing delay.

4. The method according to claim 2, wherein A2≤10%*Delay−2*Distance/C, wherein Distance represents a distance between the first device and the respective second device corresponding to the first measurement result, C represents a speed of light, the delay is a fixed sum of delays that is defined at a physical layer, Delay=aCCATime+aRxTxTurnaroundTime+MACProcessingDelay, aCCATime is a clear channel assessment delay, aRxTxTurnaroundTime is a receive/transmit turnaround delay, and MACProcessingDelay is a media access control (MAC) layer processing delay.

5. The method according to claim 4, wherein if the Distance is less than a preset distance threshold, it indicates that the location of the first device coincides with a location of the respective second device corresponding to the first measurement result, and A2≤10%*Delay, and the Distance is obtained through analysis by the first device based on signal strength of the measurement frame sent by the respective second device corresponding to the first measurement result.

6. The method according to claim 1, wherein the first measurement result is a measurement result of $i^{th}$ time measurement, t1 and t4 are recorded by the respective second device corresponding to the first measurement result in a process of the $i^{th}$ time measurement, t2 and t3 are recorded by the first device in the process of the $i^{th}$ time measurement, t1 and t4 are carried in a measurement frame sent by the respective second device corresponding to the first measurement result to the first device in a process of $(i+1)^{th}$ time measurement, and i is a positive integer.

7. The method according to claim 1, wherein the plurality of second devices comprises at least three second devices that are not in one straight line, and an algorithm for calculating a planimetric location (x, y) of the first device is as follows:

$$\begin{cases} \sqrt{(x_{AP1}-x)^2+(y_{AP1}-y)^2} = C*[(t4_{AP1}-t1_{AP1})-(t3_{AP1}-t2_{AP1})]/2 \\ \sqrt{(x_{AP2}-x)^2+(y_{AP2}-y)^2} = C*[(t4_{AP2}-t1_{AP2})-(t3_{AP2}-t2_{AP2})]/2 \\ \sqrt{(x_{AP3}-x)^2+(y_{AP3}-y)^2} = C*[(t4_{AP3}-t1_{AP3})-(t3_{AP3}-t2_{AP3})]/2 \end{cases},$$

wherein
($x_{APm}$, $y_{APm}$) is a known location of a second device APm; $t1_{APm}$, $t2_{APm}$, $t3_{APm}$, and $t4_{APm}$ are measurement results obtained by the first device by performing time measurement with the second device APm; APm∈{AP1, AP2, AP3}; and m is a positive integer and m=1, 2, 3.

8. The method according to claim 1, wherein the plurality of second devices comprises at least four second devices that are not located on one plane, and an algorithm for calculating a location (x, y, z) of the first device in three-dimensional space is as follows:

$$\begin{cases} \sqrt{(x_{AP1}-x)^2+(y_{AP1}-y)^2+(z_{AP1}-z)^2} = C*\dfrac{[(t4_{AP1}-t1_{AP1})-(t3_{AP1}-t2_{AP1})]}{2} \\ \sqrt{(x_{AP2}-x)^2+(y_{AP2}-y)^2+(z_{AP2}-z)^2} = C*\dfrac{[(t4_{AP2}-t1_{AP2})-(t3_{AP2}-t2_{AP2})]}{2} \\ \sqrt{(x_{AP3}-x)^2+(y_{AP3}-y)^2+(z_{AP3}-z)^2} = C*\dfrac{[(t4_{AP3}-t1_{AP3})-(t3_{AP3}-t2_{AP3})]}{2} \\ \sqrt{(x_{AP4}-x)^2+(y_{AP4}-y)^2+(z_{AP4}-z)^2} = C*\dfrac{[(t4_{AP4}-t1_{AP4})-(t3_{AP4}-t2_{AP4})]}{2} \end{cases},$$

wherein
($x_{APj}$, $y_{APj}$, $z_{APj}$) is a known location of a second device APj in the three-dimensional space; $t1_{APj}$, $t2_{APj}$, $t3_{APj}$, and $t4_{APj}$ are measurement results obtained by the first device by performing time measurement with the second device APj; APj∈{AP1, AP2, AP3, AP4}; and j is a positive integer and j=1, 2, 3, 4.

9. An apparatus, configured to act as a first device, the apparatus comprising:
 a processor;
 a non-transitory memory;
 a transmitter;
 a receiver;
 a random number generator; and
 a clock;
 wherein:
  the receiver is configured to receive a measurement frame sent by a second device;
  the random number generator is configured to randomly generate a short interframe spacing within a specified fluctuation range of a nominal short interframe spacing, wherein the nominal short interframe spacing is a short interframe spacing agreed upon between the second device and the first device;

the clock is configured to wait for the short interframe spacing randomly generated by the random number generator, after the receiver finishes receiving a last symbol of the measurement frame;

the transmitter is configured to: when the wait of the clock ends, send, to the second device, an acknowledgement frame in response to the measurement frame;

the memory is configured to store a first measurement result generated through time measurement performed by the first device with the second device, wherein the measurement result comprises time stamps t1, t2, t3, and t4, t1 is a time at which the second device sends the measurement frame, t2 is a time at which the first device receives the measurement frame, t3 is a time at which the first device sends the acknowledgement frame in response to the measurement frame, and t4 is a time at which the second device receives the acknowledgement frame; and the processor is configured to calculate a location of the first device based on a plurality of measurement results that are obtained by the first device by separately performing time measurement with a plurality of third devices and that are stored in the memory, wherein the plurality of measurements results comprises the first measurement result, and the plurality of third devices includes the second device.

10. The apparatus according to claim 9, wherein the specified fluctuation range of the nominal short interframe spacing is within a first interval or a second interval, wherein the first interval is between aSIFSTime−A1 and aSIFSTime, the second interval is between aSIFSTime and aSIFSTime+A2, A1 is a maximum magnitude by which the randomly generated short interframe spacing can be shortened relative to the nominal short interframe spacing aSIFSTime, A2 is a maximum magnitude by which the randomly generated short interframe spacing can be prolonged relative to the nominal short interframe spacing, and A1 and A2 are both positive numbers.

11. The apparatus according to claim 10, wherein A1≤10%*Delay, the delay is a fixed sum of delays that is defined at a physical layer, Delay=aCCATime+aRxTxTurnaroundTime+MACProcessingDelay, aCCATime is a clear channel assessment delay, aRxTxTurnaroundTime is a receive/transmit turnaround delay, and MACProcessingDelay is a media access control (MAC) layer processing delay.

12. The apparatus according to claim 10, wherein A2≤10%*Delay-2*Distance/C, the Distance represents a distance between the first device and the second device, C represents a speed of light, the delay is a fixed sum of delays that is defined at a physical layer, Delay=aCCATime+aRxTxTurnaroundTime+MACProcessingDelay, aCCATime is a clear channel assessment delay, aRxTxTurnaroundTime is a receive/transmit turnaround delay, and MACProcessingDelay is a media access control (MAC) layer processing delay.

13. The apparatus according to claim 9, wherein the first measurement result is a measurement result of $i^{th}$ time measurement, t1 and t4 are recorded by the second device in a process of the $i^{th}$ time measurement, t2 and t3 are recorded by the first device in the process of the $i^{th}$ time measurement, t1 and t4 are carried in a measurement frame sent by the second device to the first device in a process of $(i+1)^{th}$ time measurement, and i is a positive integer.

14. A non-transitory computer readable storage medium storing instructions, wherein when the instructions are execute by one or more processors, the one or more processors cause a first device to:

receive a measurement frame sent by a second device;

randomly generate a short interframe spacing within a specified fluctuation range of a nominal short interframe spacing, wherein the nominal short interframe spacing is a short interframe spacing agreed upon between the second device and the first device;

wait for the short interframe spacing that is randomly generated, after a last symbol of the measurement frame is received;

when the wait ends, send, to the second device, an acknowledgement frame in response to the measurement frame;

store a first measurement result generated through time measurement performed by the first device with the second device, wherein the first measurement result comprises time stamps t1, t2, t3, and t4, t1 is a time at which the second device sends the measurement frame, t2 is a time at which the first device receives the measurement frame, t3 is a time at which the first device sends the acknowledgement frame in response to the measurement frame, and t4 is a time at which the second device receives the acknowledgement frame; and calculate a location of the first device based on a plurality of measurement results that are obtained by the first device by separately performing time measurement with a plurality of third devices and that are recorded in the non-transitory computer readable storage medium, wherein the plurality of measurement results comprises the first measurement result, and the plurality of third devices comprises the second device.

15. The non-transitory computer readable storage medium according to claim 14, wherein the specified fluctuation range of the nominal short interframe spacing comprises a first interval or a second interval, wherein the first interval is between aSIFSTime−A1 and aSIFSTime, the second interval is between aSIFSTime and aSIFSTime+A2, A1 is a maximum magnitude by which the randomly generated short interframe spacing can be shortened relative to the nominal short interframe spacing aSIFSTime, A2 is a maximum magnitude by which the randomly generated short interframe spacing can be prolonged relative to the nominal short interframe spacing, and A1 and A2 are both positive numbers.

16. The non-transitory computer readable storage medium according to claim 15, wherein the first measurement result is a measurement result of $i^{th}$ time measurement, t1 and t4 are recorded by the second device in a process of the $i^{th}$ time measurement, t2 and t3 are recorded by the first device in the process of the $i^{th}$ time measurement, t1 and t4 are carried in a measurement frame sent by the second device to the first device in a process of $(i+1)^{th}$ time measurement, and i is a positive integer.

17. The non-transitory computer readable storage medium according to claim 15, wherein A1≤10%*Delay, the delay is a fixed sum of delays that is defined at a physical layer, Delay=aCCATime+aRxTxTurnaroundTime+MACProcessingDelay, aCCATime is a clear channel assessment delay, aRxTxTurnaroundTime is a receive/transmit turnaround delay, and MACProcessingDelay is a media access control (MAC) layer processing delay.

18. The non-transitory computer readable storage medium according to claim 17, wherein the first measurement result is a measurement result of $i^{th}$ time measurement, t1 and t4 are recorded by the second device in a process of the $i^{th}$ time measurement, t2 and t3 are recorded by the first device in the process of the $i^{th}$ time measurement, t1 and t4 are carried in a measurement frame sent by the second device to the first device in a process of $(i+1)^{th}$ time measurement, and i is a positive integer.

19. The non-transitory computer readable storage medium according to claim 15, wherein A2≤10%*Delay-2*Distance/C, the Distance represents a distance between the first device and the second device, C represents a speed of light, the delay is a fixed sum of delays that is defined at a physical layer, Delay=aCCATime+aRxTxTurnaroundTime+MACProcessingDelay, aCCATime is a clear channel assessment delay, aRxTxTurnaroundTime is a receive/transmit turnaround delay, and MACProcessingDelay is a media access control (MAC) layer processing delay.

20. The non-transitory computer readable storage medium according to claim 14, wherein the first measurement result is a measurement result of $i^{th}$ time measurement, t1 and t4 are recorded by the second device in a process of the $i^{th}$ time measurement, t2 and t3 are recorded by the first device in the process of the $i^{th}$ time measurement, t1 and t4 are carried in a measurement frame sent by the second device to the first device in a process of $(i+1)^{th}$ time measurement, and i is a positive integer.

\* \* \* \* \*